Patented Jan. 2, 1934

1,941,623

UNITED STATES PATENT OFFICE 1,941,623

RECOVERY OF SULPHUR

Ludwig Rosenstein, San Francisco, Calif., assignor to United Verde Copper Company, a corporation of Delaware No Drawing. Application November 28, 1930
Serial No. 498,753

10 Claims. (Cl. 23—226)

This invention relates to the recovery of sulphur and has for an object the provision of an improved process for recovering elemental sulphur from substances containing compounds of sulphur. More particularly, the invention contemplates the provision of an improved process for recovering sulphur from gases containing hydrogen sulphide and sulphur dioxide.

Gases containing sulphur compounds are produced and wasted in many types of industrial operations. The sulphur compound most frequently found in waste gases is sulphur dioxide which forms a component of gases resulting from the smelting or roasting of sulphide ores. The wasting of such gases, and particularly smelter or roaster gases, constitutes an economic loss, as a relatively large percentage of each type of sulphide ore treated is sulphur which is oxidized during the smelting operation. The wasting of the gases may also constitute a nuisance as they may be harmful to vegetation in the locality in which they are produced and wasted.

Many attempts have been made to recover the sulphur from ores in the form of elemental sulphur. These attempts have included the treatment of smelter gases containing sulphur dioxide with reducing agents such as carbonaceous agents and hydrogen sulphide, but they have been for the most part unsuccessful commercially. Processes involving the use of carbonaceous reducing agents require the development and maintenance of high temperatures, and they have been unsuccessful because of the cost of the agents and because of chemical and mechanical difficulties involved in carrying out the reactions and in recovering the elemental sulphur produced. While the reactions involved are exothermic, the concentration of sulphur dioxide in the smelter gases available is low, and the heat developed by the reactions is not sufficient to maintain the required temperatures because of the large amounts of inert or diluent gases which must be heated. Efforts have been made to eliminate the necessity for heating large amounts of inert or diluent gases by preliminarily treating the smelter gases to obtain relatively pure sulphur dioxide gas or gases containing higher percentages of sulphur dioxide than the smelter gases. Such efforts have been unsuccessful largely because the cost of the preliminary treatment approached or was greater than the cost of heating the inert or diluent gases.

Processes involving the reduction of sulphur dioxide with hydrogen sulphide have been unsuccessful because of the chemical and mechanical difficulties involved in carrying out the reaction involved and in collecting the elemental sulphur produced. While sulphur dioxide and hydrogen sulphide react to produce elemental sulphur and water, the reaction is normally so slow as to be uncommercial. Efforts have been made to devise conditions under which the speed of the reaction might be increased sufficiently to make processes employing the reaction commercially feasible. These efforts have met with varying degrees of success. In most instances, the advantages resulting from the increased speed of reaction obtained have been more than offset by disadvantages in the nature of increased costs and increased difficulties in obtaining the elemental sulphur produced by the reaction in marketable form.

The development of a commercial process involving the use of hydrogen sulphide for reducing sulphur dioxide is highly desirable, as the raw materials employed in processes from which waste gases containing sulphur dioxide result or the sulphur dioxide of the waste gases may be employed to produce hydrogen sulphide at a relatively low cost.

It is well known that water will promote a reaction between hydrogen sulphide and sulphur dioxide, but this phenomenon has not heretofore contributed materially to the solution of the problem of recovering elemental sulphur because of the difficulties involved in bringing the two gases into a reacting relationship sufficiently rapidly. It has been proposed, heretofore, to pass a mixture of gases containing hydrogen sulphide and sulphur dioxide through a body of water or through a water spray but the results obtained in carrying out such procedures have not been sufficiently satisfactory to warrant their use commercially.

I have discovered that the ability of water to promote a reaction between hydrogen sulphide may be utilized advantageously by employing the water in a state of fine subdivision to provide a large area of contact surfaces. This may be accomplished by providing the water in the form of a fog containing microscopic droplets or by providing a large number of thin liquid water films with which the reacting gases may come in contact.

The process of my invention may be carried out in any suitable manner, and any suitable type of apparatus may be employed. It is desirable that during the course of the process sulphur dioxide and hydrogen sulphide be brought into reacting relationship in the presence of liquid water films in such a manner and under such conditions that large quantities of the gases may be caused to react rapidly and continuously. This may be accomplished by providing liquid water films having a large total surface area and by conducting the operation in such a manner that intimate contact of the reacting gases with each other and with the liquid water films is achieved constantly.

It is, of course, desirable to avoid the necessity for employing large and costly apparatus in order to provide the total desirable area of liquid water films and in order to provide the desired intimate contact of reacting gases and liquid water films. Large surfaces which may serve as carriers for water films may be provided by employing a reaction chamber provided with enclosing side walls and having rigid staggered baffles so arranged within the interior as to provide a tortuous path for the travel of gases from one end of the chamber to the opposite end. Suitable conduits or supply means may be provided for supplying water for the purpose of maintaining liquid water films on the surfaces of the baffles and the side walls of the reaction chamber. Such an arrangement provides a space defined by rigid walls capable of maintaining or supporting liquid water films and in which mixtures of gases containing sulphur dioxide and hydrogen sulphide may be assured of intimate contact with liquid water films.

An effect similar to that obtained in employing a reaction chamber provided with baffles may be obtained by employing granular or particulate material in a suitable reaction chamber. When granular material is employed a mixture of gases may be passed through a bed of the material or passed over a bed of the material in such a manner that intimate contact is permitted. Liquid water films may be established and maintained on the particles of material, for example, by means of a water spray directed upon the mass of granular material. In employing granular materials it is desirable that the particles be of such sizes that a porous or permeable bed or mass is produced.

The films of liquid water may be formed on sheets or relatively large surfaces, either continuous or produced by subdivision or granulation, of water-insoluble substantially impervious materials, but the same or a better effect may be obtained by employing water-insoluble absorbent materials containing pores on the inner surfaces of which films of liquid water may be formed. Water-soluble substances may also be employed as carriers for the liquid water films. The soluble substances may include hygroscopic salts such as zinc chloride and calcium chloride and non-hygroscopic salts such as sodium chloride. The use of a water-soluble salt will permit easy separation of the carrier and elemental sulphur deposited thereon or mixed therewith by leaching. The use of hygroscopic salts provides the additional advantage of facilitating the maintenance of liquid films.

I prefer to employ, as carriers of the liquid water films, adsorbent materials such, for example, as those well-known substances which are capable of adsorbing relatively large quantities of gases and materials which are useful in promoting reactions between gaseous reagents.

Following are representative substances which may be employed in carrying out the process of my invention:—

I. Mineral gels, including
  A.—Zeolites
  B.—Silica gel
  C.—Iron oxide gel.
II. Carbonaceous materials, including
  A.—Bone char
  B.—Charcoal
  C.—Cellulosic materials, such as
    1.—Saw dust
    2.—Wood shavings
    3.—Cork
    4.—Cotton linter.
III. Insoluble aluminum compounds, including
  A.—Aluminum oxide
  B.—Bauxite
  C.—Clays.
IV. Miscellaneous substances, including
  A.—Elemental sulphur
  B.—Mixtures of two or more of the substances included in groups I, II and III. Such mixtures may include, for example, carbonaceous or cellulosic materials and mineral gels in which the mixing is conducted during the course of preparation of the gels and in which the resulting products consist of carbonaceous or cellulosic materials impregnated with mineral gels.
  C.—Soluble salts,
    1.—Zinc chloride
    2.—Calcium chloride
    3.—Sodium chloride.

The process may be carried out at any suitable temperature and pressure. The pressure within the reaction chamber should be such that water will always be maintained in the liquid phase at the temperature employed. I prefer to conduct the reaction at a temperature above the melting point of elemental sulphur and at a pressure sufficiently high to maintain water in the liquid phase within the reaction chamber at the temperature employed. Any desired pressure in excess of that required to maintain water in the liquid phase may be employed.

In carrying out a preferred process of my invention, a carrier substance for water films is placed in a suitable reaction chamber such, for example, as a vertical tower having shelves therein so arranged as to provide a tortuous path for the travel of gases therethrough. The carrier substance in granulated or finely divided form is placed in beds on the shelves and films of water are maintained on the particles or granules by introducing a spray of water at the top of the tower and permitting it to flow downwardly over the carrier material.

A mixture of gases containing hydrogen sulphide and sulphur dioxide in suitable proportions for carrying out the reaction expressed by the following equation is passed through the reaction chamber or tower:—

$$2H_2S + SO_2 = 2H_2O + 3S$$

As the gases pass through the reaction chamber the reaction expressed by the above equation takes place and elemental sulphur is produced.

In addition to providing for the maintenance of liquid films, the water introduced by means of the spray may also function to dissipate the heat generated by the reaction and to carry away elemental sulphur produced. The water containing elemental sulphur in suspension is withdrawn at the bottom of the tower and the water and sulphur may be separated by filtration or sedimentation or by other well-known methods. The mixture of gases is preferably introduced at the top of the tower and caused to flow downwardly, but it may be introduced at the bottom and passed upwardly through the tower.

Instead of introducing a gaseous mixture of hydrogen sulphide and sulphur dioxide into the reaction chamber, one of the reagents may be introduced in solution in the water employed for forming and maintaining the films.

The efficiency of the carrier material contained in the tower may be reduced eventually sufficiently that its renewal or revivification becomes necessary because of the deposition of sulphur thereon or within the pores. Sulphur may be separated from the carrier material by means of steam or water heated to a temperature above the melting point of sulphur. During the operation of separating sulphur from the carrier material, the material may be permitted to remain in the reaction chamber or it may be removed from the reaction chamber and treated in a separate vessel. If the material is permitted to remain in the reaction chamber during the process of revivification, the introduction of hydrogen sulphide and sulphur dioxide should be discontinued until revivification has been accomplished.

The interior of the reaction chamber in which the reaction between the sulphur dioxide and hydrogen sulphide is conducted may be maintained at any temperature at which the reaction will proceed satisfactorily. The speed of the reaction may be controlled by controlling the temperature, the speed of reaction varying in accordance with variations in temperature. High temperatures are more conducive to rapid reaction than lower temperatures. Another factor to be considered in determining the temperature at which the operation is to be conducted is the condition in which it is desired to obtain the elemental sulphur produced by the reaction. A temperature above the melting point of elemental sulphur may be employed to produce the elemental sulphur in molten condition, or a temperature below the melting point of elemental sulphur may be employed to obtain elemental sulphur in finely divided solid or semi-plastic condition.

I prefer to carry out the reaction between the sulphur dioxide and the hydrogen sulphide at temperatures above 120° C., the melting point of amorphous sulphur. The temperature may be controlled in any suitable manner but I prefer to regulate the temperature by regulating the temperature of the gas mixture entering the reaction chamber. In order that water in the liquid state may be maintained in the reaction chamber during the course of the reaction between the sulphur dioxide and the hydrogen sulphide, it is essential that the pressure within the reaction chamber be controlled in accordance with the temperature employed. Thus, in operating at temperatures above the melting point of elemental sulphur, I maintain increased pressures which will insure the presence of water in the liquid phase.

I claim:—

1. The method of producing elemental sulphur which comprises passing a mixture of sulphur dioxide and hydrogen sulphide gases through a space defined by rigid walls, and maintaining liquid films of water on the walls defining the space while the mixture of gases is being passed therethrough.

2. The method of producing elemental sulphur which comprises subjecting sulphur dioxide to the action of hydrogen sulphide in the presence of liquid water at a temperature above the melting point of sulphur.

3. The method of producing elemental sulphur which comprises subjecting sulphur dioxide to the action of hydrogen sulphide in the presence of a mineral gel and water in the liquid state.

4. The method of producing elemental sulphur which comprises subjecting sulphur dioxide to the action of hydrogen sulphide in the presence of an insoluble aluminum compound and water in the liquid state.

5. The method of producing elemental sulphur which comprises bringing sulphur dioxide and hydrogen sulphide into reacting relationship in the presence of a granular mass of mineral gel having surface films of liquid water on the particles comprising the mass.

6. The method of producing elemental sulphur which comprises bringing sulphur dioxide and hydrogen sulphide into reacting relationship in the presence of a granular mass comprising one or more insoluble aluminum compounds having surface films of liquid water on the particles comprising the mass.

7. The method of producing elemental sulphur which comprises bringing sulphur dioxide and hydrogen sulphide into reacting relationship at a temperature above the melting point of sulphur in the presence of a granular mass of one or more absorbent materials having surface films of liquid water on the particles comprising the mass.

8. The method of producing elemental sulphur which comprises bringing sulphur dioxide and hydrogen sulphide into reacting relationship at a temperature above the melting point of sulphur in the presence of a granular mass of mineral gel having surface films of liquid water on the particles comprising the mass.

9. The method of producing elemental sulphur which comprises bringing sulphur dioxide and hydrogen sulphide into reacting relationship at a temperature above the melting point of sulphur in the presence of a granular mass of absorbent carbonaceous material having surface films of liquid water on the particles comprising the mass.

10. The method of producing elemental sulphur which comprises bringing sulphur dioxide and hydrogen sulphide into reacting relationship at a temperature above the melting point of sulphur in the presence of a granular mass comprising one or more insoluble aluminum compounds having surface films of liquid water on the particles comprising the mass.

LUDWIG ROSENSTEIN.